G. BERNAUER.
CAR FENDER.
APPLICATION FILED MAR. 22, 1915.
1,164,592.
Patented Dec. 14, 1915.
2 SHEETS—SHEET 1.
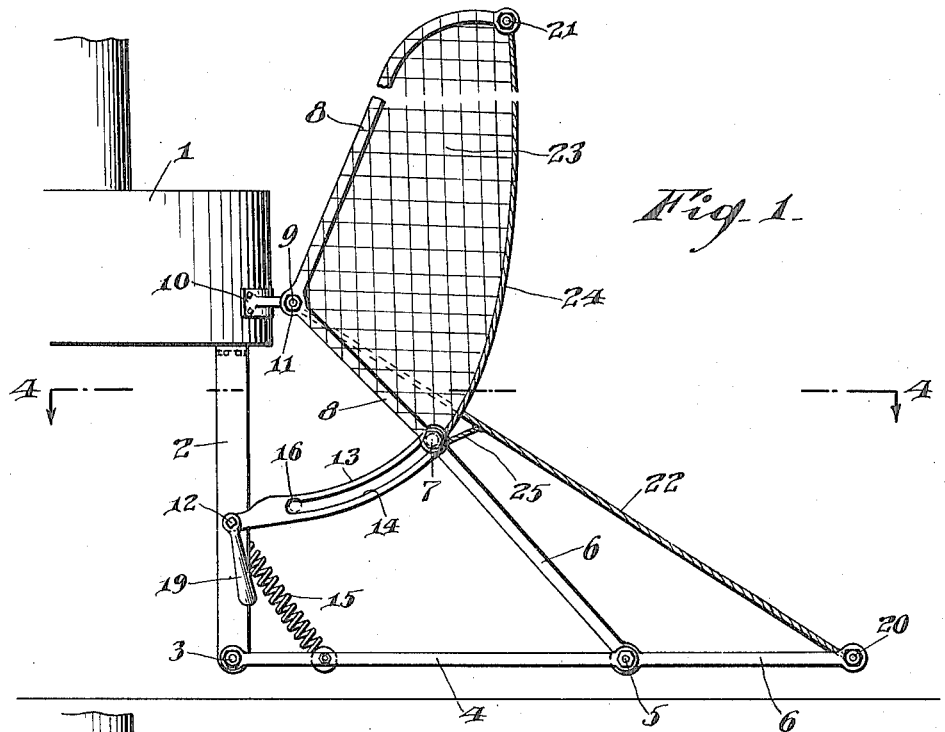
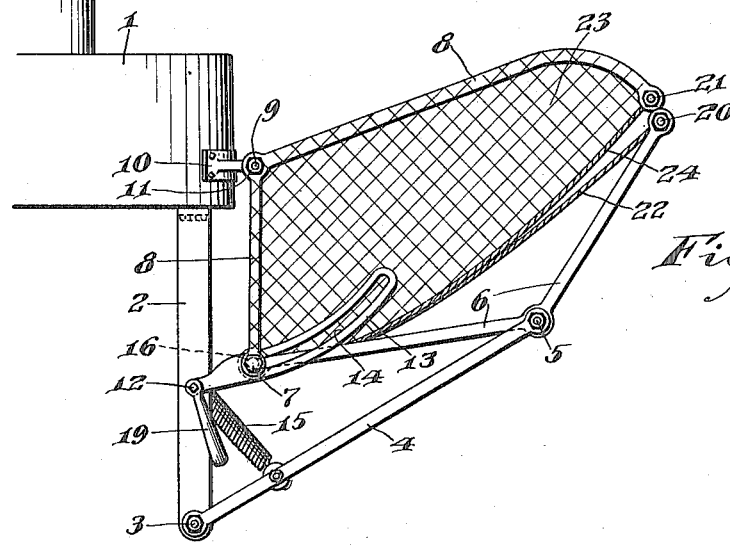
Witnesses
Inventor
Gaston Bernauer,
By Joshua R. H. Potts.
Attorney

G. BERNAUER.
CAR FENDER.
APPLICATION FILED MAR. 22, 1915.

1,164,592.

Patented Dec. 14, 1915.
2 SHEETS—SHEET 2.

Witnesses

Inventor
Gaston Bernauer,
By Joshua R. H. Potts.
Attorney

United STATES PATENT OFFICE.

GASTON BERNAUER, OF PHILADELPHIA, PENNSYLVANIA.

CAR-FENDER.

1,164,592.

Specification of Letters Patent.

Patented Dec. 14, 1915.

Application filed March 22, 1915. Serial No. 16,148.

*To all whom it may concern:*

Be it known that I, GASTON BERNAUER, a citizen of the United States, residing at Philadelphia, in the county of Philadelphia and State of Pennsylvania, have invented certain new and useful Improvements in Car-Fenders, of which the following is a specification.

My invention relates to improvements in car fenders, the object of the invention being to provide a car fender in which a portion of the fender operates as a scoop to pick up a person or object on the track, and another portion of the fender operates as an inclosure to cover the person or object on the fender and prevent any possibility of injury due to the falling of the person or object from the fender.

A further object is to provide a car fender in which the fender is caused to fold by the weight or contact of a person or object on the netting of the fender, and provide improved means for securely locking the fender in its folded position so as to prevent accidental opening.

With these and other objects in view, the invention consists in certain novel features of construction and combinations and arrangements of parts as will be more fully hereinafter described and pointed out in the claims.

Figure 3:
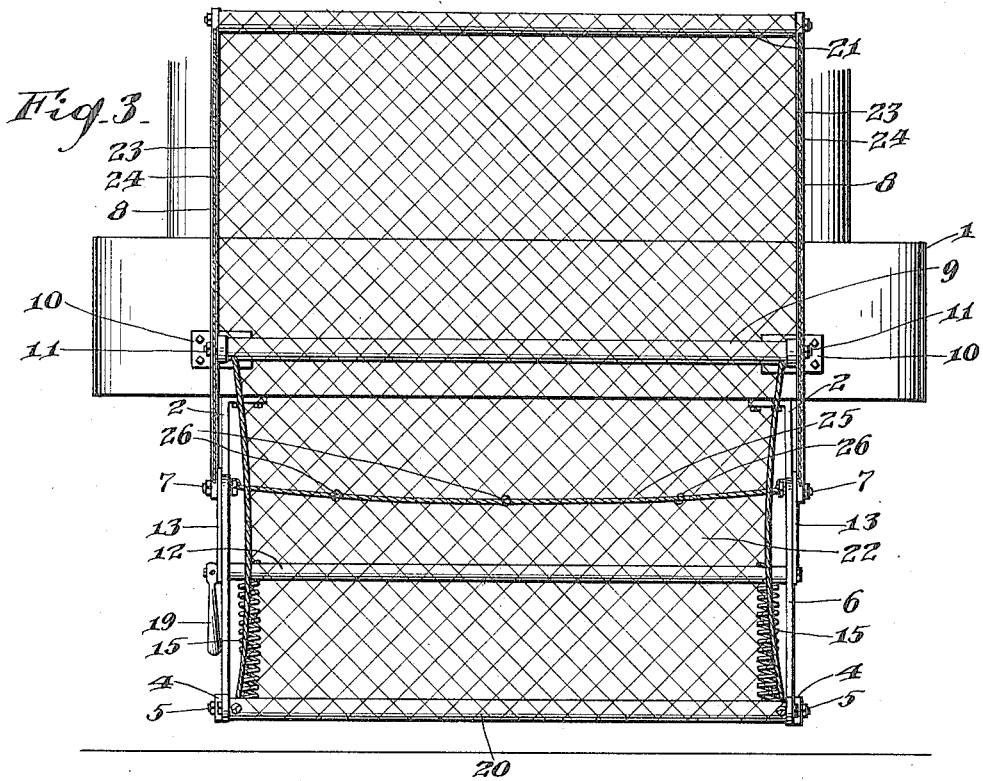
Figure 4:
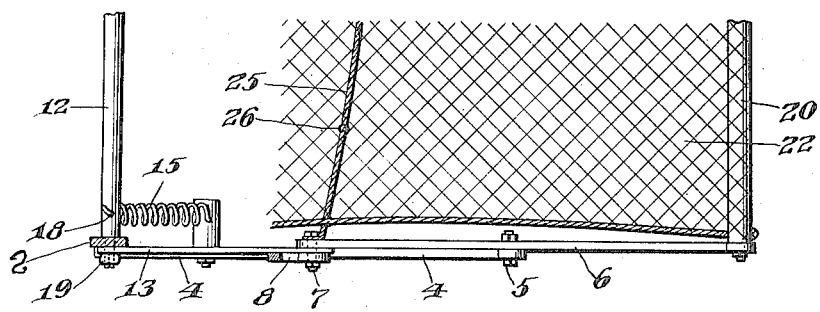

In the accompanying drawings: Figure 1 is a view in side elevation illustrating the fender in its normal set position. Fig. 2 is a similar view showing the fender in its folded position. Fig. 3 is a view in front elevation of Fig. 1, and Fig. 4 is a fragmentary view in horizontal section on the line 4—4 of Fig. 1.

1 represents the front end of the car constituting the support for the fender, and to this support depending hangers 2 are rigidly secured. These hangers 2, at their lower ends, are provided with journal bolts 3 which pivotally connect forwardly projecting links 4 to the hangers.

The angle levers 6 are of the shape shown clearly in Figs. 1 and 2, and at their angle they are pivotally connected to the forward ends of the links 4 by bolts 5. The rear ends of the levers 6 are pivotally connected by bolts 7 with angle levers 8. These latter angle levers are pivotally supported at their angles or intermediate portions by means of a transverse shaft 9 supported in brackets 10 secured to the car or other support 1.

While the invention is not limited to the particular manner of connecting the levers 8 to the shaft 9, I have indicated such securing means as consisting of nuts 11 screwed onto the threaded ends of the shaft which means permits the ready removal of the parts.

A transverse shaft 12 is supported in the hangers 2, and has fixed thereto two forwardly projecting curved crank arms 13, said crank arms having longitudinal slots 14 therein, and in the slots 14 the bolts 7 above referred to are positioned. The slots 14 limit the forward and upward movement of the bolts 7, and permit said bolts a movement just sufficient to locate the bolts 5 and 7, and shaft 9, in alinement or allow the bolts 7 a movement slightly beyond such alinement, as shown in Fig. 1, so as to maintain the parts in their set position as will be more fully hereinafter explained. Coiled springs 15 connect links 4 with shaft 12 and exert a constant upward pull on the links 4, which upward movement is prevented by the position of the pivot bolts 7. The upper walls of the slots 14 are provided adjacent the rear ends of the slots with recesses 16 to receive the bolts 7 and securely lock the bolts against forward movement until the shaft 12 is turned slightly. The arms 13 press downwardly by gravity, but in order to provide an additional downward pressure, the ends of the springs 15 are projected through openings 18 in the shaft 12, and the tendency of the springs is to turn the shaft in a direction to press the arms downwardly.

A crank arm 19 is secured on one end of the shaft 12, and this crank arm may be moved to turn the shaft and elevate the arms 13 to release the bolts 7 from the recesses 16, and permit the bolts to move forwardly in the slots 14, so that the fender may be moved to set position as shown in Fig. 1.

A buffing bar 20 connects the forward ends of levers 6, and a bar or rod 21 connects the upper forward ends of the levers 8. A flexible netting 22 is supported at its forward end by the buffer bar 20, and is connected at its other end to the rod 21. This netting 22 is also connected at its intermediate portion to the shaft 9, and side nettings 23 are secured to the levers 8 and are reinforced at their forward edges by ropes 24. While the netting 22 constitutes a portion of the covering fender, as well as the scoop fender, I shall hereinafter for purposes of clearness, refer to that portion of the fender comprising the lever 6, buffer bar 20 and flexible netting 22, as a "scoop fender", and that portion of the fender comprising the levers 8, netting 22, and nettings 23 as the "covering fender", and will refer to the bolts 7 as "pivotal devices" connecting the scoop fender and the covering fender.

A rope or other preferably flexible device 25 connects the two bolts 7, and is located under the netting 22 so that while a downward pressure on the netting serves to move the bolts downwardly and rearwardly by reason of the pressure against the rope 25, the person falling on the netting is not injured by the contact as would be the case if the connection between the bolts was a rigid one.

While the invention is not limited to the particular manner of securing the rope 25 to the bolts, I have illustrated the ropes as having eyes or being knotted at their ends to receive and tightly engage the bolts 7 back of the bolt heads, the said rope 25 being secured to the fender netting 22, preferably by means of cords 26 as shown in Fig. 3.

Fig. 1 illustrates the fender in its normal set position, and it will be noted that when the fender is in this position, the pivot bolts 7 are in the forward ends of the slots 14 of arms 13, and are so located relative to the pivots 9 and 5 that the tension of the springs 15 cannot close the fender. When a person falls upon the netting 22 by reason of contact with the buffer bar 20, the weight of such person and the impact will move the netting downwardly, press upon the rope 25, and move the pivot bolts 7 slightly below and out of alinement with the shaft 9 and bolts 5 when the springs 15 will draw links 4 upwardly, and cause the scoop fender and the covering fender to move toward each other and inclose the person. This last-named position of the fender is shown clearly in Fig. 2, and when in such position, the pivot bolts 7 will engage in the recesses 16 of arms 13, and will be locked against movement so that the fender cannot open accidentally to allow the person in the fender to fall out. When it is desired to remove the person or to reset the fender, arm 19 is swung forwardly and upwardly to move the arms 13 in a direction to release the bolts 7 from the recesses 16. When the bolts are thus released, the fender can be moved to set position as shown in Fig. 1.

While I have referred to the parts 20 and 21 as bars and indicated them as rigid devices, I do not limit myself to any particular manner of constructing these parts, but would have it understood that I may utilize any form of connecting medium between the two bars of the frames which may be utilized for the purpose.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a pair of forwardly projecting supporting members, and a scoop fender pivotally connected thereto, of a pivotally supported covering fender, pivotal devices connecting the fenders, and when the fenders are in set position located in substantial alinement with the fender pivots, and means compelling the fenders to move together when the pivotal devices are moved out of alinement with the fender pivots, substantially as described.

2. The combination with a pair of forwardly projecting supporting members, and a scoop fender pivotally connected thereto, of a pivotally supported covering fender, pivotal devices connecting the fenders, and when the fenders are in set position located in substantial alinement with the fender pivots, a flexible device connecting the pivots, and movable by a weight on the scoop fender to move the pivotal devices out of alinement with the fender pivots, and elastic means adapted to move the fenders together, substantially as described.

3. The combination with a pair of forwardly projecting supporting members, and a scoop fender pivotally connected thereto, of a pivotally supported covering fender, pivotal devices connecting the fenders, and when the fenders are in set position located in substantial alinement with the fender pivots, said pivotal devices being moved out of alinement with the fender pivots when a weight falls on the scoop fender, and elastic means constructed to move the fenders together when permitted by the movement of the pivotal devices, substantially as described.

4. The combination with a pair of forwardly projecting links constituting a support, of a scoop fender pivotally connected to the support, a covering fender pivotally connected to the support in a higher plane than the scoop fender, pivotal devices connecting the scoop fender and the covering fender, and when the fenders are in set position located in substantial alinement with the pivots of the fenders, and means compelling the fenders to move toward each other when the pivotal devices are moved out of alinement with the fender pivots, substantially as described.

5. The combination with a pair of forwardly projecting supporting members, and a scoop fender pivotally connected thereto, of a pivotally supported covering fender, pivotal devices connecting the fenders, and when the fenders are in set position located in substantial alinement with the fender pivots, said pivotal devices being moved out of alinement with the fender pivots when a weight falls on the scoop fender, means limiting the movement of the pivotal devices in both directions, and means for moving the fenders together when the pivotal devices are moved out of alinement with the fender pivots, substantially as described.

6. The combination with a pair of forwardly projecting links constituting a support, of a scoop fender pivotally connected to the support, a covering fender pivotally connected to the support in a higher plane than the scoop fender, pivotal devices connecting the scoop fender and the covering fender, and when the fenders are in set position located in substantial alinement with the pivots of the fenders, means limiting the movement of the pivotal devices in both directions, and means for moving the fenders together when the pivotal devices are moved out of alinement with the fender pivots, substantially as described.

7. The combination with a pair of forwardly projecting supporting members, and a scoop fender pivotally connected thereto, of a pivotally supported covering fender, pivotal devices connecting the fenders, and when the fenders are in set position located in substantial alinement with the fender pivots, said pivotal devices moved out of alinement with the fender pivots when a weight falls on the scoop fender, means limiting the movement of the pivotal devices in both directions, elastic means constructed to move the fenders together when the pivotal devices are moved out of alinement with the fender pivots, and means engaging the pivotal devices and locking the fenders against movement when the fenders are together, substantially as described.

8. The combination with a pair of forwardly projecting links constituting a support, of a scoop fender pivotally connected to the support, a covering fender pivotally connected to the support in a higher plane than the scoop fender, pivotal devices connecting the scoop fender and the covering fender, and when the fenders are in set position located in substantial alinement with the pivots of the fenders, means limiting the movement of the pivotal devices in both directions, elastic means constructed to move the fenders together when the pivotal devices are moved out of alinement with the fender pivots, and means engaging the pivotal devices and locking the fenders against movement when the fenders are together, substantially as described.

9. The combination with a pair of forwardly projecting supporting members, and a scoop fender pivotally connected thereto, of a pivotally supported covering fender, pivotal devices connecting the fenders, and when the fenders are in set position located in substantial alinement with the fender pivots, said pivotal devices moved out of alinement with the fender pivots when a weight falls on the scoop fender, a shaft, arms on the shaft having curved slots therein in which the pivotal devices move, and said arms having recesses in the upper walls of their slots for the reception of the pivotal devices when the latter are in their rearward position, whereby the fenders are locked against opening movement, substantially as described.

10. The combination with a pair of forwardly projecting links constituting a support, of a scoop fender pivotally connected to the support, a covering fender pivotally connected to the support in a higher plane than the scoop fender, pivotal devices connecting the scoop fender and the covering fender, and when the fenders are in set position located in substantial alinement with the pivots of the fenders, a shaft, arms on the shaft having curved slots therein in which the pivotal devices move, and said arms having recesses in the upper walls of their slots for the reception of the pivotal devices when the latter are in their rearward position, whereby the fenders are locked against opening movement, substantially as described.

11. The combination with a pair of forwardly projecting supporting members, and a scoop fender pivotally connected thereto, of a pivotally supported covering fender, pivotal devices connecting the fenders, and when the fenders are in set position located in substantial alinement with the fender pivots, said pivotal devices moved out of alinement with the fender pivots when a weight falls on the scoop fender, a shaft, arms on the shaft having curved slots therein which the pivotal devices move, said arms having recesses in the upper walls of their slots for the reception of the pivotal devices when the latter are in their rearward position, whereby the fenders are locked against opening movement, and a crank arm on said shaft adapted to be manually operated to move the arms and release the pivotal devices from locking engagement therewith, substantially as described.

12. The combination with a pair of forwardly projecting links constituting a support, of a scoop fender pivotally connected to the support, a covering fender pivotally connected to the support in a higher plane than the scoop fender, pivotal devices connecting the scoop fender and the covering fender, and when the fenders are in set position located in substantial alinement with the pivots of the fenders, a shaft, arms on the shaft having curved slots therein in which the pivotal devices move, and said arms having recesses in the upper walls of their slots for the reception of the pivotal devices when the latter are in their rearward position, whereby the fenders are locked against opening movement, and a crank arm on said shaft adapted to be manually operated to move the arms and release the pivotal devices from locking engagement therewith, substantially as described.

13. The combination with a support, hangers secured to the support, forwardly projecting links pivotally connected to the hangers, a scoop fender pivotally connected between its ends to the links, a covering fender pivotally connected to the support in a plane above the scoop fender, pivotal devices connecting the fender, and when the fenders are in set position located in substantial alinement with the fender pivots, and springs secured to the links and exerting an upward pull thereon and adapted to move the fenders together when the pivotal devices are moved rearwardly, substantially as described.

14. The combination with a support, hangers secured to the support, forwardly projecting links pivotally connected to the hangers, a scoop fender pivotally connected between its ends to the links, a covering fender pivotally connected to the support in a plane above the scoop fender, pivotal devices connecting the fender, and when the fenders are in set position located in substantial alinement with the fender pivots, a shaft supported in the hangers, curved and longitudinally slotted arms on the shaft guiding and limiting the movement of the pivotal devices, and springs connecting the shaft and the first-mentioned links exerting an upward pull on the links, substantially as described.

15. The combination with a support, hangers secured to the support, forwardly projecting links pivotally connected to the hangers, a scoop fender pivotally connected between its ends to the links, a covering fender pivotally connected to the support in a plane above the scoop fender, pivotal devices connecting the fender, and when the fenders are in set position located in substantial alinement with the fender pivots, a shaft supported in the hangers, curved and longitudinally slotted arms on the shaft guiding and limiting the movement of the pivotal devices, springs connecting the shaft and the first-mentioned links exerting an upward pull on the links, said slotted arms having recesses for the reception of the pivotal devices to lock the fenders against opening movement, substantially as described.

16. The combination with a support, hangers secured to the support, forwardly projecting links pivotally connected to the hangers, a scoop fender pivotally connected between its ends to the links, a covering fender pivotally connected to the support in a plane above the scoop fender, pivotal devices connecting the fender, and when the fenders are in set position located in substantial alinement with the fender pivots, a shaft supported in the hangers, curved and longitudinally slotted arms on the shaft guiding and limiting the movement of the pivotal devices, springs connecting the shaft and the first-mentioned links exerting an upward pull on the links, said slotted arms having recesses for the reception of the pivotal devices, to lock the fenders against opening movement, and a crank arm on said shaft adapted to turn the shaft and move the arms to release the pivotal devices from locked engagement in the recesses, substantially as described.

In testimony whereof I have signed my name to this specification in the presence of two subscribing witnesses.

GASTON BERNAUER.

Witnesses:
LADIS BERNAUER,
MARIE JACKSON.

Copies of this patent may be obtained for five cents each, by addressing the "Commissioner of Patents, Washington, D. C."